US009960519B2

(12) United States Patent
Lee

(10) Patent No.: US 9,960,519 B2
(45) Date of Patent: May 1, 2018

(54) ELECTRODE STRUCTURE WITH ELECTRIC-SHOCK PREVENTION FUNCTION

(71) Applicant: VISION TECH. INC., Busan (KR)

(72) Inventor: Ho-Seok Lee, Busan (KR)

(73) Assignee: Vision Tech. Inc., Busan (KR)

( * ) Notice: Subject to any disclaimer, the term of this patent is extended or adjusted under 35 U.S.C. 154(b) by 365 days.

(21) Appl. No.: 14/759,916

(22) PCT Filed: Oct. 22, 2013

(86) PCT No.: PCT/KR2013/009404
§ 371 (c)(1),
(2) Date: Jul. 8, 2015

(87) PCT Pub. No.: WO2014/109462
PCT Pub. Date: Jul. 17, 2014

(65) Prior Publication Data

US 2015/0357742 A1 Dec. 10, 2015

(30) Foreign Application Priority Data

Jan. 9, 2013 (KR) ........................ 10-2013-0002669
Jan. 10, 2013 (KR) ........................ 10-2013-0003155
(Continued)

(51) Int. Cl.
*H02H 11/00* (2006.01)
*H01R 13/44* (2006.01)
(Continued)

(52) U.S. Cl.
CPC ............... *H01R 13/44* (2013.01); *H01R 4/66* (2013.01); *H01R 13/648* (2013.01)

(58) Field of Classification Search
CPC ........ H01R 13/44; H01R 4/66; H01R 13/646; H01R 13/523; H02H 5/083; H02H 5/12
See application file for complete search history.

(56) References Cited

U.S. PATENT DOCUMENTS 6,917,170 B2 7/2005 Terakawa et al.
2002/0036432 A1* 3/2002 Nagao ................ H01R 13/4538 307/326

(Continued)

FOREIGN PATENT DOCUMENTS

CN 1550635 A 12/2004
EP 2 876 740 A1 5/2015
(Continued)

OTHER PUBLICATIONS

Japanese Notice of Allowance dated Feb. 8, 2017 in counterpart Japanese Patent Application No. 2015-552563 (2 pages, in Japanese).

(Continued)

*Primary Examiner* — Rexford Barnie
*Assistant Examiner* — Rasem Mourad
(74) *Attorney, Agent, or Firm* — NSIP Law

(57) ABSTRACT

The present invention relates to electric equipment technology, and more particularly to an electric structure used in various devices of electric equipment. The electrode structure body with electric-shock prevention function is connected to a power transmission and distribution path to electric equipment. The electrode structure body with electric-shock prevention function prevents electric shock when the electric equipment connected to the electrode structure body or other equipment electrically connected thereto at a near place is submerged.

6 Claims, 8 Drawing Sheets

(30) Foreign Application Priority Data

| | | |
|---|---|---|
| Mar. 8, 2013 | (KR) | 10-2013-0025037 |
| Jul. 29, 2013 | (KR) | 10-2013-0089708 |
| Aug. 28, 2013 | (KR) | 10-2013-0102697 |
| Sep. 30, 2013 | (KR) | 10-2013-0116731 |

(51) Int. Cl.

| | |
|---|---|
| ***H01R 4/66*** | (2006.01) |
| ***H01R 13/648*** | (2006.01) |

(56) References Cited

U.S. PATENT DOCUMENTS

| | | | | |
|---|---|---|---|---|
| 2013/0169919 A1 | | 7/2013 | Hong et al. | |
| 2015/0194804 A1 | * | 7/2015 | An | H02H 5/083 307/326 |
| 2015/0198931 A1 | * | 7/2015 | Lee | G08B 21/24 307/326 |

FOREIGN PATENT DOCUMENTS

| | | | | | |
|---|---|---|---|---|---|
| JP | 56-113104 A | | 9/1981 | |
| JP | 58-22044 U | | 2/1983 | |
| JP | 58022044 U | * | 2/1983 | |
| JP | 58-22044 B2 | | 5/1983 | |
| JP | 59-171358 A | | 9/1984 | |
| JP | 61-87489 U | | 6/1986 | |
| JP | 2-56785 A | | 2/1990 | |
| JP | 4-17627 U | | 2/1992 | |
| KR | 20-0314968 Y1 | | 6/2003 | |
| KR | 20-0339079 Y1 | | 1/2004 | |
| KR | 10-2005-0037986 A | | 4/2005 | |
| KR | 20-0413968 Y1 | | 4/2006 | |
| KR | 10-0731051 B1 | | 6/2007 | |
| KR | 20-2009-0003192 U | | 4/2009 | |
| KR | 20-0445226 Y1 | | 7/2009 | |
| KR | 10-1197414 B1 | | 11/2012 | |
| KR | 101197414 B1 | * | 11/2012 | H02H 5/083 |
| KR | 10-2013-0079052 A | | 7/2013 | |
| KR | 10-1197414 B1 | | 5/2014 | |

OTHER PUBLICATIONS

Japanese Office Action dated May 24, 2016 in counterpart Japanese Application No. JP 2015-552563 (3 pages, in Japanese).

Kim, Hyang-Kon, Dong-Woo Kim, and Hyo-Sang Choi. "DC Leakage Current Properties Analtsis of the LED Lamps of Road and Landscapes Lighting." The Transactions of the Korean Institute of Electrical Engineers 60.4 (2011): 885-891.

International Search Report dated Jan. 27, 2014 in International Application No. PCT/KR2013/009404 (4 pages, in Korean, with English language translation).

Chinese Office Action dated Aug. 2, 2016 in counterpart Chinese Patent Application No. 201380071082.2 (5 pages, in Chinese).

* cited by examiner

ELECTRODE STRUCTURE WITH ELECTRIC-SHOCK PREVENTION FUNCTION

CROSS-REFERENCE TO RELATED APPLICATIONS

This application is a U.S. National Stage Application of International Application No. PCT/KR2013/009404, filed on Oct. 22, 2013 which claims the benefit under 35 USC 119(a) and 365(b) of Korean Patent Application No. 10-2013-0002669, filed on Jan. 9, 2013, Korean Patent Application No. 10-2013-0003155, filed on Jan. 10, 2013, Korean Patent Application No. 10-2013-0025037, filed on Mar. 8, 2013, Korean Patent Application No. 10-2013-0089708, filed on Jul. 29, 2013, Korean Patent Application No. 10-2013-0102697, filed on Aug. 28, 2013 and Korean Patent Application No. 10-2013-0116731, filed on Sep. 30, 2013 in the Korean Intellectual Property Office.

TECHNICAL FIELD

The present invention generally relates to a technique for electric equipment, and more particularly to an electrode structure body used in various devices of electric equipment.

BACKGROUND ART

Various types of electrodes are used for electrical contact or electrical measurement in electrical outlets, plugs, or switchboards. If an exposed electrode causes a current leakage, an electric shock may occur. The human body may get an electric shock when an electric current, of which level is higher than a specific value, flows from a power source to the ground surface through the human body. In general, a current that is greater than 15 mA causes human bodies to convulse, and a current greater than 50 mA may kill humans. The main cause of death is heart attack, in which an electric current flowing through the heart damages nerves and causes the heart to stop working. The risk of electric shock depends on the body resistance when an electric current is passed to the human body, and the body resistance varies depending on the condition of the skin.

When electric equipment, such as an electrical outlet, an electric heater, or an electric lamp, is submerged in water, and a human body contacts water or a metal housing to which an electric current is applied through water, the electric current flows from an exposed conductor of electric equipment to the ground surface through water and the human body. In this case, the wet skin, which has a very low contact resistance, leads to the risk of electrocution.

Korea Patent Publication No. 10-2005-0037986 published on Apr. 25, 2005 discloses an electric shock prevention apparatus for preventing electric shock resulting from water immersion, in which in cases of water immersion, electric current leakage from an exposed charging part may be conducted to a conductive metal plate or a conductive metal net which is attached to the exposed charging part, such that an electric shock may be prevented. The metal plate or metal net is connected through wires to a neutral line or an earth terminal among terminal stands, and the size of the metal plate is about 50 cm×30 cm.

While its principle is not described in detail, it appears that in cases of water immersion, an electric current may be prevented from flowing into the human body by interposing a metal plate between submerged conductors having a resistance much lower than the resistance of water and the human body so that the metal plate may be electrically arranged in parallel with the human body. However, the metal plate or the metal net is connected to a terminal stand through a separate wire, and has a huge volume, and thus the space for installation is limited.

Korean Patent No. 10-1197414 published on Nov. 5, 2012 discloses another apparatus for preventing a current leakage, which includes: a connection terminal stand which includes a first connection terminal and a second connection terminal that are disposed between an input terminal and an output terminal and are connected to a phase voltage terminal and a neutral point terminal; and a current leakage preventing conductor that is electrically connected to the second connection terminal connected to the neutral point terminal, so as to surround a lateral side and a top side of the connection terminal stand.

The apparatus for preventing a current leakage has a complicated structure including an electrode that surrounds a connection terminal stand and is connected to a neutral point terminal. Further, it is difficult to apply the apparatus to a small electrical outlet and the like.

Technical Problem

An object of the present invention is to provide an electrode structure body having an electric shock prevention function and a simple structure, thereby enabling installation in a convenient manner.

Further, another object of the present invention is to provide an electrode structure body having an electric shock prevention function, in which the electrode structure body may be used in many applications, including small electrical outlets, power breakers, or outdoor street lamps.

Technical Solution

In order to achieve the above object, an electrode structure body having an electric shock prevention function is connected to a power transmission and distribution path to electric equipment. The electrode structure body prevents electric shock when the electric equipment, to which the electrode structure body is connected, is submerged, or other equipment which is electrically connected to the electric equipment at a near place is submerged.

In one general aspect, there is provided an electrode structure body having an electric shock prevention function, the electrode structure body including: a first input terminal to which a first electric wire of an input side is connected; a second input terminal to which a second electric wire of an input side is connected; a first output terminal to which a first electric wire of an output side is connected; a second output terminal to which a second electric wire of an output side is connected. Further, the electrode structure body having an electric shock prevention function may include a first flat conductor and a second flat conductor. The first flat conductor has one end that is fixed to the first input terminal and the other end that is fixed to the first output terminal, has a width and a length that are greater than the first electric wire, and has an area, which is obtained by multiplying the width and the length, and which is 4 times to 100,000 times a cross-sectional area of the first electric wire. The second flat conductor has one end that is fixed to the second input terminal and the other end that is fixed to the second output terminal, and has a size that is identical to the first flat conductor. In addition, the electrode structure body having an electric shock prevention function may further include a non-conductive housing that fixes the first flat conductor and the second flat conductor so that the first flat conductor and the second flat conductor may be electrically separated from each other.

The first flat conductor and the second flat conductor may be made of a copper (Cu) material.

The housing may fix the first flat conductor and the second flat conductor so that the first flat conductor and the second flat conductor may face each other.

The electrode structure having an electric shock prevention function may be formed to be erected with the first flat conductor and the second flat conductor facing each other, and may be installed at a position lower than electric equipment to be protected from water immersion.

The electrode structure body having an electric shock prevention function may be a power breaker.

The electrode structure body having an electric shock prevention function may be an electrical outlet.

Advantageous Effects

Experiments have been conducted and proved that a simple structure may be enabled by installing a pair of flat conductors on a power transmission and distribution path, thereby substantially reducing an electric current flowing into the human body that contacts leaked current nearby.

MODE FOR INVENTION

The above-described embodiments and other features will become more apparent from the following exemplary embodiments. Hereinafter, exemplary embodiments of the present invention will be described in detail with reference to the accompanying drawings to allow those of ordinary skill in the art to easily understand and carry out the present invention.

Figure 1:
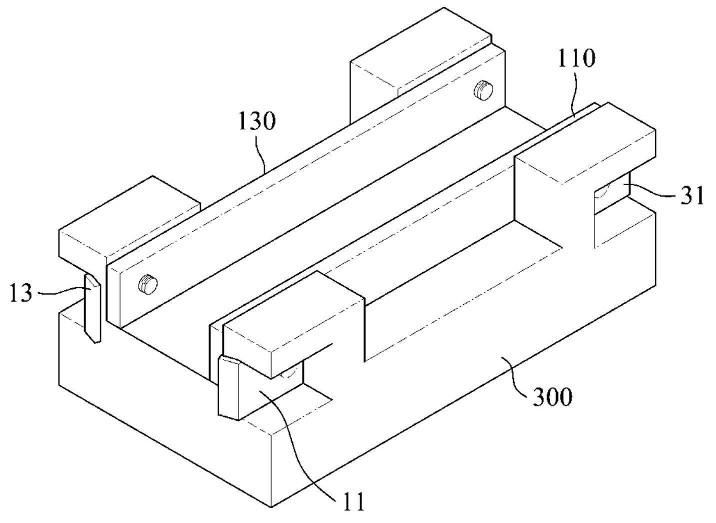
FIG. 1 is a diagram illustrating an external view of an electrode structure body having an electric shock prevention function according to an exemplary embodiment of the present invention.
Figure 2:
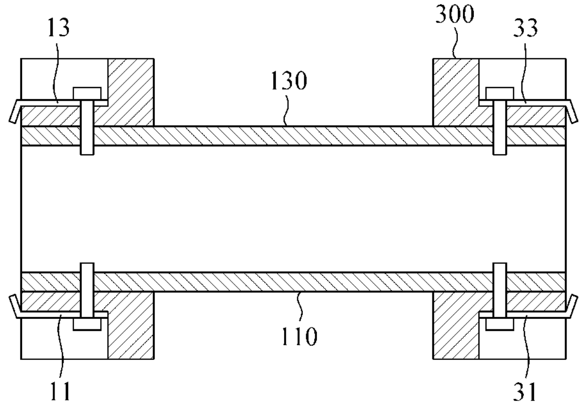
FIG. 2 is a cross-sectional view of FIG. 1 cut across the center of four terminal screws.

FIG. 1 is a diagram illustrating an external view of an electrode structure body having an electric shock prevention function according to an exemplary embodiment of the present invention. FIG. 2 is a cross-sectional view of FIG. 1 cut across the center of four terminal screws. The electrode structure body having an electric shock prevention function will be described with reference to FIGS. 1 and 2.

The electrode structure body having an electric shock prevention function is connected to a power transmission and distribution path of home or industrial electric equipment, e.g., lamps, street lamps, electrical outlets, plugs, motors, etc. As will be described below, the electrode structure body having an electric shock prevention function prevents an electric shock when the electric equipment having the electrode structure body is submerged in water, or when other electric equipment that is electrically connected to the electric equipment at a near place is submerged.

As illustrated in FIGS. 1 and 2, the electrode structure body having an electric shock prevention function includes: a first input terminal 11 to which a first electric wire of an input side is connected; a second input terminal 13 to which a second electric wire of the input side is connected; a first output terminal 31 to which a first electric wire of an output side is connected; and a second output terminal 33 to which a second electric wire of the output side is connected. In addition, the electrode structure body having an electric shock prevention function further includes a first flat conductor 110 and a second flat conductor 130. The first flat conductor 110 has one end that is fixed to the first input terminal and the other end that is fixed to the first output terminal. The first flat conductor 110 has a width and a length which are greater than a thickness of the first electric wire, and has an area which is obtained by multiplying the width and the length, and is 4 times to 10,000 times the cross-sectional area of the first electric wire. The second flat conductor 130 has one end that is fixed to the second input terminal and the other end that is fixed to the second output terminal, and has the same size as the first flat conductor 110. Moreover, the electrode structure body having an electric shock prevention function may further include a non-conductive housing 300 that fixes the first flat conductor 110 and the second flat conductor 130 so that the first flat conductor and the second flat conductor may be electrically separated from each other.

Generally, the first electric wire of the input side that is screw-coupled to the first input terminal 11 and the second electric wire of the input side that is screw-coupled to the second input terminal 13 have the same physical and electrical size; however, the present invention is not limited thereto. Similarly, the first electric wire of the output side that is screw-coupled to the first output terminal 31 and the second electric wire of the output side that is screw-coupled to the second output terminal 33 generally have the same physical and electrical size; however, the present invention is not limited thereto. The electrode structure body having an electric shock prevention function is installed on a power transmission and distribution path, such that the first electric wire of the input side and the first electric wire of the output side are generally the same physical and electrical wires, and the second electric wire of the input side and the second electric wire of the output side are the same physical and electrical wires; however, the present invention is not limited thereto.

In one exemplary embodiment, the first input terminal 11, the second input terminal 13, the first output terminal 31, and the second output terminal 33 are formed to be identical to each other. However, each terminal or each pair may be formed to be different. In the exemplary embodiment, as illustrated in FIGS. 1 and 2, the terminals may include: screw holes perforated in both ends of the second flat conductor; screws inserted into the screw holes to be fixed therein; and an auxiliary plate that is attached to the housing by the screws and that assists fixing of an uncovered conducting wire between the screws and the housing 300. In another exemplary embodiment, the terminals may include terminal stands that are pressure-fixed to one end of a flat conductor. The terminals may be formed to connect wires to both ends of a flat conductor in various manners.

The housing 300 is a structure that physically fixes terminals and flat conductors. For example, in the case where an electrode structure body is applied to an electrical outlet, the housing may be an electrical outlet housing. In the case where an electrode structure body is applied to a switchboard, the housing may be a bracket or a frame that fixes terminals of the switchboard. The illustrated exemplary embodiment is applied to a two-wired type, such that the housing fixes two flat conductors, but in the case of a three-wired type, the housing may be modified to fix three flat conductors. The housing may be made of a plastic or a ceramic material that is non-conductive.

Since it is desired that flat conductors are exposed to each other to the maximum while being immersed in water, the housing has a structure that fixes both ends of the flat conductors so that most portions of the flat conductors are exposed while being suspended in air. In the illustrated exemplary embodiment, the flat conductors are fixed at a position lower than the outer outline of the housing, so as to prevent an operator from getting an electric shock by carelessly contacting the flat conductors exposed while or after being installed. Specifically, four columns projecting on top of the housing fix the flat conductors by using terminals, in which the columns project thereon at a position a little higher than the fixed flat conductors. In addition, the housing may further include a cover on the outside. The cover may be formed to have a sufficient number and size of holes to allow in sufficient water when being immersed in water while preventing careless contact.

In another exemplary embodiment, the housing may fix the first flat conductor and the second flat conductor so that the first flat conductor and the second flat conductor may face each other. When the electrode structure body having an electric shock prevention function is submerged in water, water fills the space between the two flat conductors, and then electric resistance is formed by water and two flat conductors. Electrical resistance is in proportion to the length of a resistor and is in reverse proportion to the cross-sectional area thereof, such that when flat conductors face each other, the cross-sectional area is maximized and the length is minimized, thereby minimizing electrical resistance. Accordingly, when the electrode structure body is connected in parallel with the human body and a ground surface, an electric current flowing into the body having a greater resistance may be minimized.

In another exemplary embodiment, the electrode structure body having an electric shock prevention function is formed to be erected with the first flat conductor and the second flat conductor facing each other, and is installed at a position lower than electric equipment to be protected from water immersion. For example, in the case of a street lamp, a controller exposed at a lower portion thereof is installed at a water-proof space, but if the space is submerged in water, people near the space are at risk of electric shock. The electrode structure body having an electric shock prevention function is installed in the water-proof space at a position lower than the controller so that the electrode structure body is immersed in water before the controller is submerged, thereby operating first.

In another exemplary embodiment, the first flat conductor and the second flat conductor may be made of a copper (Cu) material. Experiments showed that in the case where a flat conductor is made of a copper material, rather than an iron or an aluminum material, the electrode structure body having an electric prevention function exhibits excellent effects.

Figure 3:
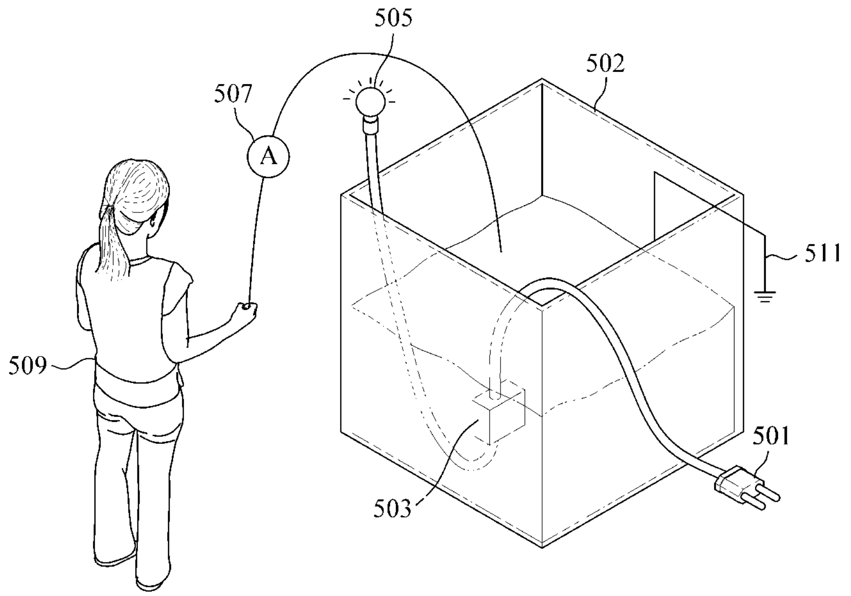
FIG. 3 is a diagram illustrating an arrangement of devices in a first experiment.

FIG. 3 is a diagram illustrating an arrangement of devices in a first experiment. In the first experiment, a water tank 502 is filled with water, and an electrode structure body 503 having an electric shock prevention function according to an exemplary embodiment is immersed in the water tank 502 with one end thereof being connected to a plug, and a lamp 505 provided at the other end thereof is exposed to the outside of the water tank, with water not being on a ground surface. At this point in time, the plug 501 is inserted into an electrical outlet to supply power. It can be seen that although the electrode structure body 503 having an electric shock prevention function is submerged in water, the lamp 505 is turned on. Subsequently, an experimenter 509 grabs one exposed end of the wire and immerses the other exposed end in the water tank, and measures a current flowing through the wire by using an ammeter 507. Since it may be dangerous if the experimenter 509 directly conducts the experiment, an animal having conductivity similar to the human body may be used instead. Table 1 below shows results obtained by repeating the experiment illustrated in FIG. 3 with flat conductors of various widths and lengths, in which commercial power at 220V/60 Hz was applied, a light bulb of 120 W was connected as load, and the distance between two flat conductors facing each other was 10 mm. Further, the wire used in the experiment includes a cylindrical conductor having a diameter of 1.8 mm. In Table 1 below, the row indicates the width of a flat conductor, the column indicates the length of the flat conductor, and measured values are expressed in mA.

TABLE 1

| | Width | | | | | |
|---|---|---|---|---|---|---|
| Length | 0.9 mm | 1.8 mm | 3.6 mm | 7.2 mm | 14.4 mm | 28.8 mm |
| 0.9 mm | 13.12 | 12.51 | 12.07 | 11.42 | 11.03 | 10.02 |
| 1.8 mm | 12.52 | 2.52 | 1.10 | 0.90 | 0.75 | 0.67 |
| 3.6 mm | 12.05 | 1.10 | 0.95 | 0.75 | 0.67 | 0.37 |
| 7.2 mm | 11.41 | 0.90 | 0.75 | 0.67 | 0.37 | 0.21 |
| 14.4 mm | 11.02 | 0.75 | 0.67 | 0.37 | 0.21 | 0.11 |
| 28.8 mm | 10.03 | 0.67 | 0.37 | 0.21 | 0.11 | 0.05 |
| 57.6 mm | 9.81 | 0.37 | 0.21 | 0.11 | 0.05 | 0.01 |

The experiment result shows that the current flowing through the human body is weak in all sizes of flat conductors, such that there is no risk of electric shock. The reason for this is assumed that when a single phase current flows through water in the water tank, voltage drop occurs in water, which is sterically hindered, and when the human body contacts water, the current flowing into the human body is determined to be a current previous or prior to the single-phase current depending on the position of a human body part immersed in water, such that the human body is exposed to much lower alternating current power than in the case of directly contacting a common single-phase current. However, it was not found out how the two flat conductors may further prevent the current from flowing into the human body.

The following data shows results of experiment conducted in the same manner as above except that the ground wire 511 is immersed in water of a water tank to conduct electric current to water. The experiment was conducted to show the case where a street lamp is submerged and electric current is conducted to water that electrically contacts the ground, which is the condition in reality where electric equipment is submerged. It can be seem that there is no substantial change in the amount of current leakage even under the condition.

TABLE 2

| | Width | | | | | |
|---|---|---|---|---|---|---|
| Length | 0.9 mm | 1.8 mm | 3.6 mm | 7.2 mm | 14.4 mm | 28.8 mm |
| 0.9 mm | 13.21 | 12.79 | 12.21 | 11.68 | 11.12 | 10.13 |
| 1.8 mm | 12.79 | 2.54 | 1.12 | 0.92 | 0.77 | 0.69 |
| 3.6 mm | 12.21 | 1.12 | 0.97 | 0.77 | 0.69 | 0.39 |
| 7.2 mm | 11.68 | 0.92 | 0.77 | 0.69 | 0.39 | 0.23 |
| 14.4 mm | 11.12 | 0.77 | 0.69 | 0.39 | 0.23 | 0.13 |
| 28.8 mm | 10.13 | 0.69 | 0.39 | 0.23 | 0.13 | 0.07 |
| 57.6 mm | 10.01 | 0.39 | 0.23 | 0.13 | 0.07 | 0.03 |

The following data shows current leakage occurring around a flat conductor in a water tank according to distances. From the experiments, a correlation between a leaked current on a conductive wire and a leaked current around the flat conductor may be identified.

TABLE 3

| | Distance | | | |
|---|---|---|---|---|
| Area | 0 cm | 5 cm | 10 cm | 15 cm |
| 14.4 mm × 28.8 mm | 0.304 | 0.230 | 0.170 | 0.120 |
| 28.8 mm × 28.8 mm | 0.605 | 0.054 | 0.009 | 0.005 |

The above experiment leads to an assumption that most currents flow around the space between flat conductors facing each other. Before the flat conductors were installed, an electric field of 943V/m was formed between two exposed wires, while after the flat conductors were installed, the electric field exceeded a threshold of 1,999V/m.

The experiment may be modeled in an electric circuit with electric current being conducted to water as an electric resistance between two flat conductors. The human body may be modeled as another resistance connected between the electric resistance and the conducted ground surface. It can be understood by a general method of using an electric circuit that the human body and water which are resistances between two flat conductors are connected in parallel in an electric circuit, such that a current flowing into the human body may be prevented.

As shown in Table 1 and Table 2, there is no significant difference in terms of measured values between a case where electric current is conducted to water in a water tank and a case where no current is conducted, indicating that there is no significant difference in the risk of electric shock. In addition, it can be seen that if either one of the width or the length of a flat conductor is smaller than the diameter of the conductor, the current amount is significantly increased, indicating that the risk of electric shock is increased.

Moreover, from the results shown in Table 1 and Table 2, it can be seen that the current flowing through the human body depends on the area of a flat conductor and a cross-sectional area of a cylindrical wire. The area of a flat conductor is obtained by multiplying the width and the length of a plate of a flat conductor. In the experiment result shown in Table 2, the radius of the wire is r, the width of the wire is 2r, and the cross-sectional area of the wire is $\pi r^2$, such that the area of a flat conductor, for example, in the first row of Table 2 may be $(r)(r)=r^2$, $(r)2r=2r^2$, $(r)(4r)=4r^2$, $(r)(8r)=8r^2$, $(r)(16r)=16r^2$, $(r)(32r)=32r^2$ and the like, and a ratio of the area of a flat conductor to a cross-sectional area of a wire may be $1/\pi=0.32$, $2/\pi=0.64$, $4/\pi=1.27$, $8/\pi=2.55$, $16/\pi=5.09$, $32/\pi=10.19$, and the like.

In Table 2 showing a condition where an electric current is conducted to water, which is similar to a condition where electric equipment is immersed in water in reality, an electric current of 2.54 mA or higher, which is a reference value, flows when a ratio of the area of the flat conductor to the cross-sectional area of the cylindrical wire is about 1.27 or lower; and when the ratio is 5.09, an electric current of 0.97 mA flows. From the experiment, it can be seen that when the area of a flat conductor is four times the cross-sectional area of a cylindrical wire, an electric current at a degree that does not harm the human body flows under a normal condition.

As the size of a flat conductor is increased, production costs are increased and greater space is required, thereby causing a problem in terms of commercial use. Generally, when the diameter of a wire is about 2 mm, the cross-sectional area is 3.14 $mm^2$; and 100,000 times the cross-sectional area of 3.14 $mm^2$ is 3,140 $mm^2$, in which when the width of the flat conductor is 10 cm, the length thereof is 314 cm, showing that such huge size, as compared to the size of the wire, is difficult to be used in commercial applications.

Figure 4:
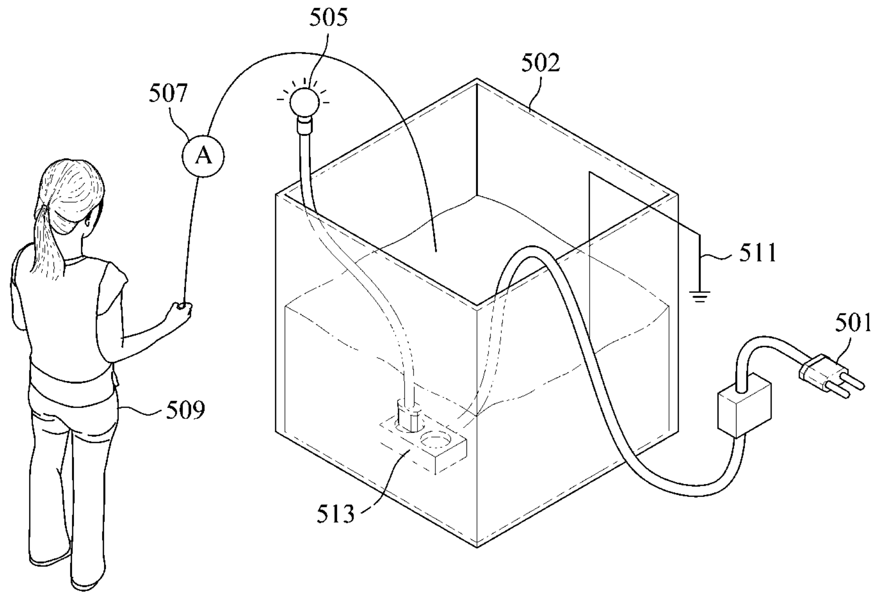
FIG. 4 is a diagram illustrating an arrangement of devices in a second experiment.

FIG. 4 is a diagram illustrating an arrangement of devices in a second experiment. The second experiment was conducted in such a manner that a water tank 502 is filled with water, an electrode structure body 503 having an electric shock prevention function according to an exemplary embodiment is exposed to the outside of the water tank 502 while immersing in the water tank 502 another electric equipment, e.g., an electrical outlet 513, which is connected to the electrode structure body 503 having an electric shock prevention function, and another electric equipment, e.g., a lamp 505, which is connected to the electrical outlet, is exposed to the outside of the water tank. At this point in time, the plug 501 is inserted into the electrical outlet to supply power. It can be seen that although another electric equipment, i.e., the electrical outlet 513, is immersed in water without submerging the electrode structure body 503 having an electric shock prevention function, the lamp 505 is turned on. Subsequently, an experimenter 509 grabs one exposed end of the wire and immerses the other exposed end in the water tank, and measures a current flowing through the wire by using an ammeter 507. Since it may be dangerous if the experimenter 509 directly conducts the experiment, an animal having conductivity similar to the human body may be used instead. In the experiment, commercial power at 220V/60 Hz was applied, a light bulb of 120 W was connected as load, and the distance between two facing flat place conductors was 10 mm. Further, a wire used in the experiment includes a cylindrical conductor having a diameter of 1.8 mm. In the following Table, the row indicates the width of a flat conductor, the column indicates the length thereof, and measured values are expressed in mA. Results of the experiment were similar to those in Table 1. Applicants of the present invention may not describe the experiment results by using electric modeling, but merely assume that when two flat conductors are exposed in air, an electric current flowing into the human body was changed.

The following data shows results of experiment conducted in the same manner as above, except that an electric current was conducted to water by immersing the ground wire 511 in water of a water tank. The experiment was conducted to show the case where a street lamp is submerged and electric current is conducted to water that electrically contacts the ground, which is the condition in reality where electric equipment is submerged, in which more electric current flow than the above experiment.

TABLE 4

| | Width | | | | | |
|---|---|---|---|---|---|---|
| Length | 0.9 mm | 1.8 mm | 3.6 mm | 7.2 mm | 14.4 mm | 28.8 mm |
| 0.9 mm | 13.71 | 13.21 | 12.71 | 12.18 | 11.62 | 10.63 |
| 1.8 mm | 13.21 | 3.02 | 2.63 | 1.67 | 1.82 | 1.74 |
| 3.6 mm | 12.71 | 2.63 | 1.85 | 1.46 | 1.30 | 1.22 |
| 7.2 mm | 11.18 | 1.67 | 1.46 | 1.30 | 1.21 | 0.80 |
| 14.4 mm | 11.62 | 1.82 | 1.30 | 1.21 | 0.77 | 0.62 |
| 28.8 mm | 10.63 | 1.74 | 1.19 | 1.80 | 0.62 | 0.65 |
| 57.6 mm | 10.51 | 1.21 | 0.80 | 0.69 | 0.65 | 0.62 |

Figure 5:
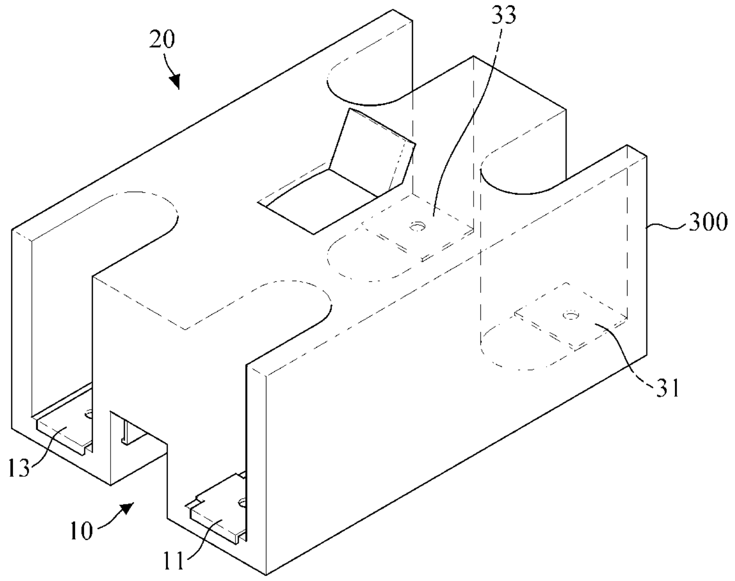
FIG. 5 is a diagram illustrating an example of applying an electrode structure body having an electric shock prevention function to a power breaker.
Figure 6:
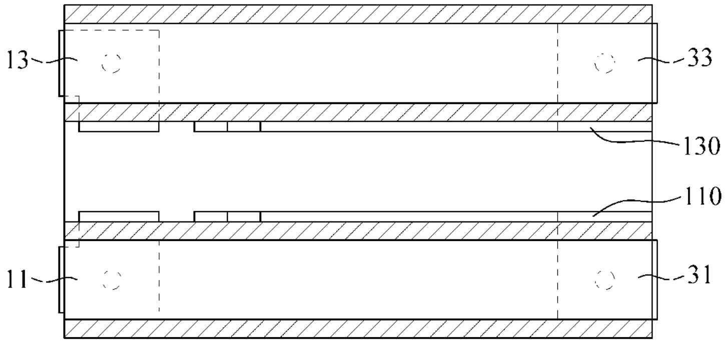
FIG. 6 is a rear view illustrating the power breaker illustrated in FIG. 5.
Figure 7:
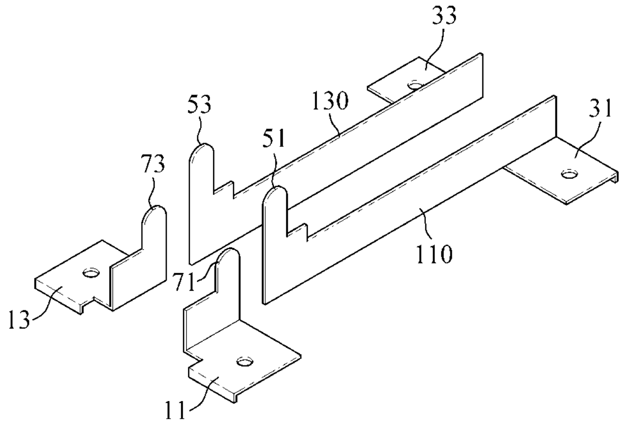
FIG. 7 is a diagram illustrating an example of input terminals and flat conductors in the power breaker illustrated in FIG. 5.

By referring to FIGS. 5 to 7, an example of applying an electrode structure body having an electric shock prevention function to a power breaker will be described. FIG. 5 is a diagram illustrating an example of applying an electrode structure body having an electric shock prevention function to a power breaker. FIG. 6 is a rear view illustrating the power breaker illustrated in FIG. 5. FIG. 7 is a diagram illustrating an example of input terminals and flat conductors in the power breaker illustrated in FIG. 5.

A power breaker used in the example may be connected, for example, to a power transmission and distribution path of home or industrial electric equipment. As will be described below, even when there is a failure in a power breaking function, the power breaker may prevent electric shock when electric equipment installed at a rear end of the power breaker is submerged or when other electric equipment that is electrically connected to the electric equipment at a near place is submerged.

As illustrated in FIGS. 5 to 7, the power breaker includes: a first input terminal 11 to which a first electric wire of an input side is connected; a second input terminal 13 to which a second electric wire of the input side is connected; a first output terminal 31 to which a first electric wire of an output side is connected; and a second output terminal 33 to which a second electric wire of the output side is connected. The power breaker includes: a power breaking component 20 configured to break a circuit connection when overcurrent flows while input terminals are connected to the first and second input terminals; and an electric shock prevention component 10. Further, the power breaker includes a first flat conductor 110 and a second flat conductor 130. The power breaking component 20 may control electric connection between input ends and output ends by connecting the input ends to connecting pieces 73 and 71 of the first and the second input terminals; and by connecting output ends to connecting pieces 51 and 53 formed on the other end of the first and the second flat conductors 110 and 130 with which the first and the second output terminals 31 and 33 are integrally formed on one end thereof.

The first flat conductor 110 has one end that is connected to the first output terminal 31 and the connecting piece 51 formed at the other end that is connected to one of the output terminals of the power breaking component. The width and the length of the first flat conductor 110 are greater than the width of the first electric wire, and the area of the first flat conductor 110, which is obtained by multiplying the width and the length thereof, is 4 times to 100,000 times the cross-sectional area of the first electric wire. The second flat conductor has one end that is connected to the other output terminal and the other end that is connected to the second output terminal, and has the same size as the first flat conductor. In addition, the power breaking component may include a non-conductive housing that fixes the first flat conductor and the second flat conductor so that the first flat conductor and the second flat conductor may be electrically separated from each other.

In one exemplary embodiment, the power breaking component 20 includes: an overcurrent detector that detects overcurrent while monitoring a current supplied from the input terminal and the output terminal; an actuator that operates when the overcurrent is detected by the overcurrent detector; and a switch that blocks connection between the input terminals and the output terminals by using the actuator. The types and configurations of the power blocking component are generally known in the art, such that detailed descriptions thereof will be omitted.

An electric shock prevention component 10 according to an exemplary embodiment includes the first flat conductor 110 and the second flat conductor 130. The first plate conductor 110 has one end that is connected to one of the output terminals of the power breaking component 20 through the first connecting piece 51 and the other end that is connected to the first terminal 31. The width and the length of the first flat conductor 110 are greater than the width of the first electric wire, and the area of the first flat conductor 110, which is obtained by multiplying the width and the length thereof, is 4 times to 100,000 times the cross-sectional area of the first electric wire. The second flat conductor has one end that is connected to the other output terminal and the other end that is connected to the second output terminal, and has the same size as the first flat conductor. In addition, the power breaking component may include a non-conductive housing that fixes the first flat conductor and the second flat conductor so that the first flat conductor and the second flat conductor may be electrically separated from each other.

Generally, the first electric wire of the input side that is screw-coupled to the first input terminal 11 and the second electric wire of the input side that is screw-coupled to the second input terminal 13 have the same physical and electrical size; however, the present invention is not limited thereto. Similarly, the first electric wire of the output side that is screw-coupled to the first output terminal 31 and the second electric wire of the output side that is screw-coupled to the second output terminal 33 generally have the same physical and electrical size; however, the present invention is not limited thereto. The electrode structure body having an electric shock prevention function is installed on a power transmission and distribution path, such that the first electric wire of the input side and the first electric wire of the output side are generally the same physical and electrical wires, and the second electric wire of the input side and the second electric wire of the output side are the same physical and electrical wires; however, the present invention is not limited thereto.

In one exemplary embodiment, the first input terminal 11 and the second input terminal 13 may include: screw holes perforated in the housing on one end thereof; screws (not shown) inserted into the screw holes to be fixed therein; and an auxiliary plate that is attached to the housing by the screws and that assists fixing of an uncovered conducting wire between the screws and the housing 300. In another exemplary embodiment, the terminals may include terminal stands that are pressure-fixed to one end of a flat conductor. The terminals may be formed to connect wires to both ends of a flat conductor in various manners.

In one exemplary embodiment, the first input terminal 11 may include a first connecting piece 71 formed at the other bent end thereof. The first connecting piece 71 is connected to an arm connecting piece of the power breaking component 20. Similarly, in one exemplary embodiment, the second input terminal 13 may include a second connecting piece 73 formed at the other bent end thereof. The second connecting piece 73 is connected to an arm connecting piece of the power breaking component 20.

The housing 300 physically fixes terminals and flat conductors. The illustrated exemplary embodiment is applied to a two-wired type, such that the housing fixes two flat conductors, but in the case of a three-wired type, the housing may be modified to fix three flat conductors. The housing may be made of a plastic or ceramic material that is a non-conductive.

In the illustrated example, flat conductors are fixed on an inner wall of the housing with one surface exposed therefrom, in which the flat conductors are fixed at a position lower than the outer outline of the housing, so as to prevent an operator from getting an electric shock by carelessly contacting the flat conductors exposed while or after being installed. The first flat conductor and the second flat conductor are fixed by the housing to face each other.

Although the present invention may not be fully described by the electric circuit theory, it can be understood from the electrical point of view that when a power circuit breaker is immersed in water, water fills the space between two flat conductors, and then electric resistance is formed by water and two flat electrodes. The electric resistance is in proportion to the length of a resistor and in reverse proportion to the cross-sectional area thereof, such that when two flat electrodes face each other, the cross-sectional area thereof is maximized, and the electric resistance is minimized. Accordingly, when the electrode structure body is connected in parallel with the human body and a ground surface, an electric current flowing into the body having a greater resistance may be minimized.

In another exemplary embodiment, the electrode structure body having an electric shock prevention function is formed to be erected with the first flat conductor and the second flat conductor facing each other, and is installed at a position lower than electric equipment to be protected from water immersion. For example, in the case of a street lamp, a controller exposed at a lower portion thereof is installed at a water-proof space, but if the space is immersed in water, people near the space are at risk of electric shock. The electrode structure body having an electric shock prevention function is installed in the water-proof space at a position lower than the controller so that the electrode structure body is immersed in water before the controller is submerged, thereby operating first.

In yet another exemplary embodiment, the first flat conductor and the second flat conductor may be made of a copper (Cu) material. Experiments showed that in the case where a flat conductor is made of a copper material, rather than an iron or an aluminum material, the electrode structure body having an electric prevention function exhibits excellent effects.

Figure 8:
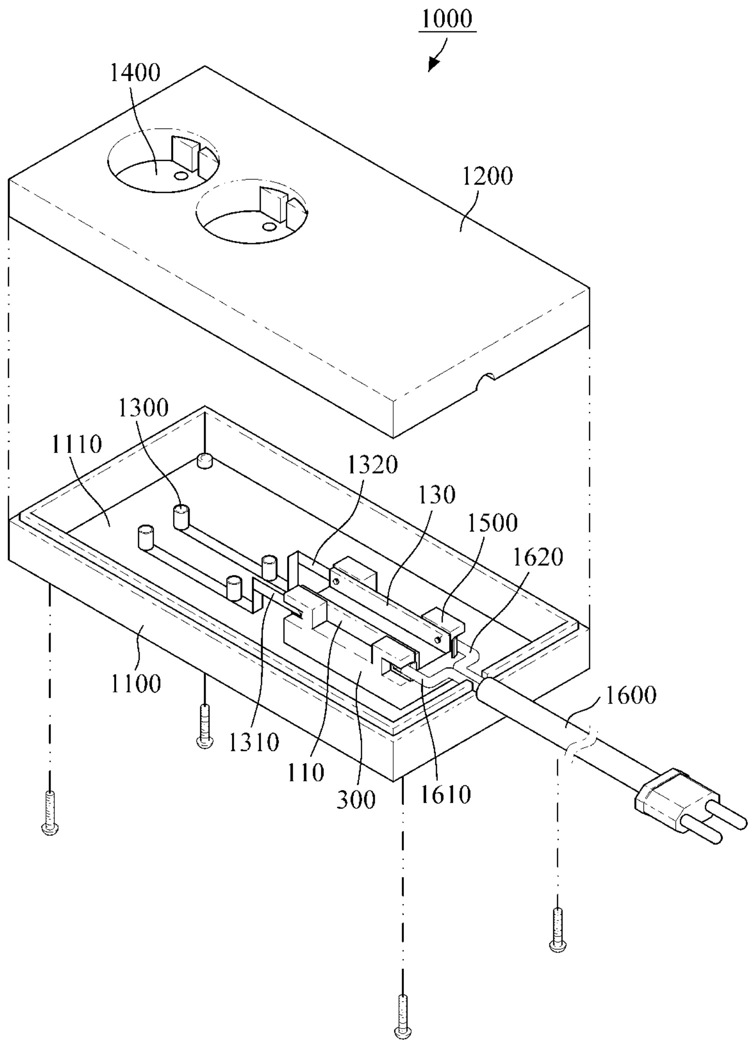
FIG. 8 is a diagram illustrating an example of applying an electrode structure body having an electric shock prevention function to an electrical outlet.

Referring to FIG. 8, an example of applying an electrode structure body having an electric shock prevention function to an electrical outlet will be described. FIG. 8 is a diagram illustrating an example of applying an electrode structure body having an electric shock prevention function to an electrical outlet.

The electrical outlet 1000 having an electric shock prevention function according to the exemplary embodiment includes a body 1100, a cover 1200, a power supply terminal 1300, a plug insertion hole 1400, and an electrode structure body 1500.

The body 1100 has a receiving space 1110 formed on the inside thereof, and is not limited to a rectangular shape as illustrated in the exemplary embodiment, but may be formed to have various shapes such as a circular shape.

The cover 1200 is connected to the top of the body 1100. The cover 1200 may be connected to the body 1100 in various manners, which is already known in the art prior to application of the present invention, such that detailed descriptions of the connection structure will be omitted.

The power supply terminal 1300 is formed on a part of the receiving space 1110 of the body 1100, and supplies power by connection with a plug. The plug is inserted into the plug insertion hole 1400 to be connected to the power supply terminal 1300 that serves as an electrode, such that commercial power may be applied through the plug to electric equipment (not shown) which is connected to the plug.

The electrode structure body 1500 is installed on a part of the receiving space 1110 of the body 1100, and is connected between the power supply terminal 1300 and a power supply line 1600 to prevent current leakage.

As illustrated in FIGS. 1 and 2, the electrode structure body 1500 includes the first input terminal 11, the second input terminal 13, the first output terminal 31, the second output terminal 33, the first flat conductor 110, the second flat conductor 130, and the non-conductive housing 300.

The first input terminal 11 is connected to a first lead wire 1310 of the power supply terminal 1300. The second input terminal 13 is connected to a second lead wire 1320 of the power supply terminal 1300. The first output terminal 31 is connected to a third lead wire 1610 of the power supply line 1600. The second output terminal 33 is connected to a fourth lead wire 1620 of the power supply line 1600.

The first flat conductor 110 is connected between the first input terminal 11 and the first output terminal 31. The width and the length of the first flat conductor 110 are greater than the first lead wire 1310, and the area thereof is 4 times to 100,000 times the cross-sectional area of the first lead wire. The second flat conductor 130 is connected between the second input terminal 13 and the second output terminal 33, and has the same size as the first flat conductor 110. The non-conductive housing 300 fixes the first flat conductor 110 and the second flat conductor 130 so that the first flat conductor and the second flat conductor may be electrically separated from each other.

Generally, the first lead wire 1310 that is screw-coupled to the first input terminal 11 and the second lead wire 1320 that is screw-coupled to the second input terminal 13 have the same physical and electrical size; however, the present invention is not limited thereto.

Similarly, the third lead wire 1610 that is screw-coupled to the first output terminal 31 and the fourth lead wire 1620 that is screw-coupled to the second output terminal 33 generally have the same physical and electrical size; however, the present invention is not limited thereto.

In the electrical outlet, the first lead wire 1310 and the third lead wire 1610 are physically and electrically the same; and the second lead wire 1320 and the fourth lead wire 1620 are physically and electrically the same; however, the present invention is not limited thereto.

In one exemplary embodiment, the first input terminal 11, the second input terminal 13, the first output terminal 31, and the second output terminal 33 are formed to have an identical shape; however, each or a pair may have a different shape. As illustrated in FIG. 8, the terminals may include:

screw holes perforated in both ends of the second flat conductor; screws inserted into the screw holes to be fixed therein; and an auxiliary plate that is attached to a housing by the screws and that assists fixing of an uncovered conducting wire between the screws and the housing 300. In another exemplary embodiment, the terminals may be formed to be pressure-fixed to one end of the first flat conductor 110 and the second flat conductor 130. The terminals may be formed to connect wires to both ends of the flat conductors in various manners.

The non-conductive housing 300 is a structure that physically fixes terminals and flat conductors. The illustrated example is applied to a two-wired type, such that the housing fixes two flat conductors, but in the case of a three-wired type, the housing may be modified to fix three flat conductors. The housing may be made of a plastic or ceramic material that is a non-conductive.

Since it is desired that flat conductors are exposed to each other to the maximum while being immersed in water, the housing has a structure that fixes both ends of the flat conductors so that most portions of the flat conductors are exposed while being suspended in air. In the illustrated exemplary embodiment, the flat conductors are fixed at a position lower than the outer outline of the housing, so as to prevent an operator from getting an electric shock by carelessly contacting the flat conductors exposed while or after being installed.

Specifically, four columns projecting on top of the housing fix the flat conductors by using terminals, in which the columns project thereon at a position a little higher than the fixed flat conductors.

In another exemplary embodiment, the non-conductive housing 300 may fix the first flat conductor and the second flat conductor so that the first flat conductor and the second flat conductor may face each other. By considering the present invention from the electrical point of view, when an electrical outlet is immersed in water, water fills the space between two flat conductors, and then electrical resistance is formed by water and the two flat conductors. Electrical resistance is in proportion to the length of a resistor and is in reverse proportion to the cross-sectional area thereof, such that when flat conductors face each other, the cross sectional area is maximized and the length is minimized, thereby minimizing electrical resistance. Accordingly, when the electrode structure body is connected in parallel with the human body and a ground surface, an electric current flowing into the body having a greater resistance may be minimized.

In another exemplary embodiment, the electrical outlet is formed to be erected with the first flat conductor and the second flat conductor facing each other, and is installed at a position lower than electric equipment to be protected from water immersion. For example, in the case of a street lamp, a controller exposed at a lower portion thereof is installed at a water-proof space, but if the space is immersed in water, people near the space are at risk of electric shock. The electrical outlet having an electric shock prevention function is installed in the water-proof space at a position lower than the controller so that the electrical outlet is immersed in water before the controller is submerged, thereby operating first.

In another exemplary embodiment, the first flat conductor 110 and the second flat conductor 130 may be made of a copper (Cu) material. Experiments showed that in the case where a flat conductor is made of a copper material, rather than an iron or an aluminum material, the electrode structure body having an electric prevention function exhibits excellent effects.

While the invention has been shown and described with reference to certain exemplary embodiments thereof, it will be understood by those skilled in the art that various changes in form and details may be made therein without departing from the spirit and scope of the invention as defined by the appended claims. For example, the present invention may also be applied to three-phase power. The appended claims are intended to cover such obvious modifications. For example, the embodiments describe an electrode structure body having a separate electric shock prevention function an example of electric equipment; however, the electrode structure body having an electric shock prevention function may be mounted in other electric equipment, e.g., a power circuit breaker, a terminal stand, an electrical outlet, a plug, a battery, or various types of other electric equipment. The embodiment may be applied through design modification of inserting two flat conductors having substantially identical size into power transmission and distribution path in the electric equipment. Accordingly, the phrase "electrode structure body having an electric shock prevention function" used in the present disclosure should be construed as including such various types of electric equipment.

The invention claimed is:

1. An electrode structure body having an electric shock prevention function in which the electrode structure body is connected to a power transmission and distribution path to electric equipment, and prevents an electric shock when the electric equipment is submerged or other electric equipment that is electrically connected to the electric equipment is submerged, the electrode structure body comprising:

- a first input terminal to which a first electric wire of an input side is connected, wherein the first electric wire of the input side comprises a first radius and a cylindrical shape;
- a second input terminal to which a second electric wire of the input side is connected, wherein the second electric wire of the input side comprises a second radius and a cylindrical shape;
- a first output terminal to which a first electric wire of an output side is connected, wherein the first electric wire of the output side comprises a third radius and a cylindrical shape;
- a second output terminal to which a second electric wire of the output side is connected, wherein the second electric wire of the output side comprises a fourth radius and a cylindrical shape;
- a first flat conductor comprising
  - a first end side fixed to the first input terminal and a second end side fixed to the first output terminal,
  - a first width and a length that are greater than a second width of the first electric wire, and
  - an area, which is obtained by multiplying the first width and the length, and which is 4 times to 100,000 times a cross-sectional area of the first electric wire;
- a second flat conductor comprising a third end side fixed to the second input terminal and a fourth end side fixed to the second output terminal, wherein a size of the second flat conductor is identical to a size of the first flat conductor; and
- a non-conductive housing fixing the first flat conductor and the second flat conductor so that the first flat conductor and the second flat conductor are electrically separated from each other, wherein the first flat conductor and the second flat conductor are installed on the power transmission and distribution path, thereby being configured to reduce an electric current flowing into a human body that contacts leaked current.

2. The electrode structure body of claim 1, wherein the first flat conductor and the second flat conductor are made of a copper (Cu) material.

3. The electrode structure body of claim 1, wherein the housing fixes the first flat conductor and the second flat conductor so that the first flat conductor and the second flat conductor face each other.

4. The electrode structure body of claim 1, wherein the electrode structure is formed to be erected with the first flat conductor and the second flat conductor facing each other, and is installed at a position lower than electric equipment to be protected from water immersion.

5. The electrode structure body of claim 1, wherein the electrode structure body comprises a power breaker.

6. The electrode structure body of claim 1, wherein the electrode structure body comprises an electrical outlet.

* * * * *